United States Patent
Wang et al.

(10) Patent No.: US 12,202,574 B2
(45) Date of Patent: Jan. 21, 2025

(54) BUOYANT STRUCTURE FOR RECEIVING A TOWER OF A WIND TURBINE IN OFFSHORE DEPLOYMENT

(71) Applicant: Seatrium (SG) Pte. Ltd., Singapore (SG)

(72) Inventors: Shuo Wang, Singapore (SG); Maya Sreedharan, Singapore (SG); Chin Lee Lim, Singapore (SG); Sinik Jang, Singapore (SG); Xiao Li Chia, Singapore (SG)

(73) Assignee: SEATRIUM (SG) PTE. LTD., Singapore (SG)

( * ) Notice: Subject to any disclaimer, the term of this patent is extended or adjusted under 35 U.S.C. 154(b) by 463 days.

(21) Appl. No.: 17/720,850

(22) Filed: Apr. 14, 2022

(65) Prior Publication Data

US 2022/0348288 A1     Nov. 3, 2022

(30) Foreign Application Priority Data

Apr. 29, 2021    (SG) ........................... 10202104452U
Dec. 27, 2021    (WO) ................ PCT/SG2021/050825

(51) Int. Cl.
    *B63B 1/12*          (2006.01)
    *B63B 21/50*      (2006.01)
    (Continued)

(52) U.S. Cl.
    CPC ............. *B63B 1/125* (2013.01); *B63B 21/50* (2013.01); *B63B 35/44* (2013.01); *B63B 39/00* (2013.01);
    (Continued)

(58) Field of Classification Search
    None
    See application file for complete search history.

(56) References Cited

U.S. PATENT DOCUMENTS 8,471,396 B2 *   6/2013   Roddier ............... F03D 7/0204
                                                          290/44
9,518,564 B2 * 12/2016   Dagher .................. B63B 1/048
                        (Continued)

FOREIGN PATENT DOCUMENTS

CN         103925172 A      7/2014
CN         108757336 A     11/2018
                  (Continued)

OTHER PUBLICATIONS

International Search Report Issued in PCT Patent Application No. PCT/SG2021/050825. Mar. 31, 2022.

*Primary Examiner* — S. Joseph Morano
*Assistant Examiner* — Jovon E Hayes
(74) *Attorney, Agent, or Firm* — Morse, Barnes-Brown & Pendleton, P.C.; Martin Z. Zhang, Esq.; Russell L. Widom

(57) ABSTRACT

Disclosed herein is a buoyant structure for offshore deployment. The buoyant structure comprises a first deck having a first channel through the first deck; a second deck having a second channel through the second deck, wherein the first deck and second deck are coupled to each other and arranged spaced apart from each other; and a plurality of floatable substructures coupled to and around at least one of the first deck and the second deck, the plurality of floatable substructures arranged spaced apart from one another, wherein the first channel and the second channel are aligned to receive at least a portion of a tower of a wind turbine.

20 Claims, 12 Drawing Sheets

(51) Int. Cl.
  *B63B 35/44* (2006.01)
  *B63B 39/00* (2006.01)
  *F03D 13/25* (2016.01)

(52) U.S. Cl.
  CPC ........ *F03D 13/25* (2016.05); *B63B 2035/446* (2013.01); *F05B 2240/93* (2013.01)

(56) References Cited

U.S. PATENT DOCUMENTS

| | | | | |
|---|---|---|---|---|
| 10,215,161 | B2 * | 2/2019 | Viselli | F03D 13/10 |
| 2014/0196654 | A1 * | 7/2014 | Roddier | F03D 9/25 |
| | | | | 290/55 |
| 2016/0230746 | A1 * | 8/2016 | Dagher | F03D 13/10 |

FOREIGN PATENT DOCUMENTS

| | | | | |
|---|---|---|---|---|
| KR | 20140075892 A | | 6/2014 | |
| WO | WO-2013155521 A1 | * | 10/2013 | ............. B63B 1/048 |
| WO | WO-2014013097 A1 | | 1/2014 | |

* cited by examiner

BUOYANT STRUCTURE FOR RECEIVING A TOWER OF A WIND TURBINE IN OFFSHORE DEPLOYMENT

CROSS-REFERENCE TO RELATED APPLICATIONS

The present application claims priority to Singapore patent application number 10202104452U filed on 29 Apr. 2021 titled "Semi Integrating Vertically Adjustable Mast (SI-VAM)" and International Application number PCT/SG2021/050825 filed 27 Dec. 2021 which are incorporated by reference herein in entirety.

TECHNICAL FIELD

The present invention relates to a buoyant structure for offshore deployment, in particular as a floating offshore wind platform or base structure to receive a tower of a wind turbine.

BACKGROUND

In the prior art, there are various floating platform designs. Most existing structures for an offshore wind turbine usually have a tubular centre for a wind turbine to be integrated into. For example, a number of known floating platforms may each include a floating base that is anchored or moored, an elevated structure extending upwardly from the floating base with a top surface of the elevated structure being kept above the sea level where a wind turbine is supported on the top surface (deck) of the elevated structure.

Other known floating platforms may each employ a column provided on the platform to allow a wind mast to be installed onto. Such a column is referred as being not column-less because the column has a solid tubular wall with a closed bottom end so as to prevent water from entering into the column through the solid tubular wall and the closed bottom end when such a floating platform is deployed for operation. Some of these floating platforms may have the column disposed at the substantial centre of the floating platform, while others may have the column dispose off-centre of the floating platform.

A current challenge faced by floating platform designs is the requirement to meet the operability of an increasing wind turbine capacity and harsher environment.

SUMMARY

In a first aspect of the invention, there is provided a buoyant structure for offshore deployment, the buoyant structure comprising: a first deck having a first channel through the first deck; a second deck having a second channel through the second deck, wherein the first deck and second deck are coupled to each other and arranged spaced apart from each other; and a plurality of floatable substructures coupled to and around at least one of the first deck and the second deck, the plurality of floatable substructures arranged spaced apart from one another, wherein the first channel and the second channel are aligned to receive at least a portion of a tower of a wind turbine. Advantageously, the buoyant structure may be used to support a wind turbine in a body of water, for example in a sea or ocean. Advantageously, the "column-less" centre provides several advantages over existing systems including a smaller water plane area in the centre of the substructure of the buoyant structure which provides better motion characteristics, reduced overall steel use and weight, and increased space availability to accommodate other functions.

Preferably, the buoyant structure further comprises a plurality of connecting elements to couple the plurality of floatable substructures to at least one of the first deck and the second deck, wherein the plurality of floatable substructures is arranged around at least one of the first deck and the second deck in a radial manner, and extends outwardly from at least one of the first deck and the second deck.

Preferably, the buoyant structure further comprises a support element to directly couple the first deck and the second deck. Advantageously, the support element allows for a shorter span between the centre of the buoyant column and the floatable substructures improving the structural integrity of the buoyant structure.

Preferably, the support element is arranged spaced apart from one another along a perimeter of the first deck and the second deck.

Preferably, the support element is selected from the group consisting of a rod, a lattice frame, a beam, a wall, and any combination thereof.

Preferably, each of the plurality of floatable substructures comprises a top surface and a bottom surface opposite to the top surface, the top surface of the first deck and the top surface of the plurality of floatable substructures are arranged substantially along a deck plane and/or a bottom surface of the second deck and the bottom surface of the plurality of floatable substructures are arranged substantially along a keel plane.

Preferably, each of the plurality of floatable substructures comprises an elongate column. More preferably, the elongate column has a polygonal horizontal cross-section. In an embodiment, the elongate column has an octagonal horizontal cross-section. In an embodiment, the elongate column has a trapezoidal horizontal cross-section. Advantageously, the polygonal cross-section reduces the amount of construction workload allowing for increased production while improving the fatigue life and significantly reducing the amount of material wastage.

Preferably, each of the plurality of floatable substructures comprises a pontoon coupled to the elongate column. More preferably, the pontoon has a polygonal horizontal cross-section. In an embodiment, the pontoon has an octagonal horizontal cross-section. In an embodiment, the pontoon has a trapezoidal horizontal cross-section. Advantageously, the polygonal cross-section reduces the amount of construction workload allowing for increased production while improving the fatigue life and significantly reducing the amount of material wastage.

In an embodiment, the elongate column is coupled to a substantially centre region of the pontoon.

In an embodiment, the elongate column is coupled to a substantially off-centre region of the pontoon. Advantageously, by having a eccentric column centre the stability performance of the buoyant structure is further enhanced making it more easily scalable from a benign to a harsh environment and from a lower megawatt to a higher megawatt turbine installation.

Preferably, the elongate column comprises a top region and a bottom region opposite to the top region, the top region is coupled to the first deck and the bottom region is coupled to the pontoon.

Preferably, the pontoon is coupled to the second deck. In an embodiment, the pontoon is further coupled to the first deck.

Preferably, the buoyant structure further comprises a jacking module configured to raise and lower the tower through the first channel and the second channel.

Preferably, the buoyant structure further comprises a plurality of anchoring points for mooring the buoyant structure and/or a ballast system.

Preferably, the plurality of floatable substructures comprises at least three floatable substructures.

In an embodiment, the buoyant structure is a semi-integrating vertically adjustable mast (SI-VAM) and is a three Column Semi-Submersible buoyant substructure designed for the Floating Offshore Wind industry where a wind turbine of any type may be integrated to the SI-VAM. The SI-VAM design features lead to significant reduction in the amount of construction workload resulting in mass production while at the same time improving fatigue life. The amount of material wastage has also been significantly reduced.

The SIV-VAM may be deployed as a Floating Offshore Wind Platform with excellent motion characteristics to improve operability with a cost effective, construction friendly solution and enhanced structural integrity. Furthermore, the SI-VAM is easily scalable to cater for increasing wind turbine capacity out in the offshore wind industry.

The design may include polygonal column(s) and pontoon(s). The design may also include a column-less column to receive a wind tower/mast there through. The column-less column may be a column-less centre column. The intent is to achieve a robust, stable, and optimized design in term of weight saving, constructability, scalability and improved motion characteristics.

In the context of various embodiments, a column-less column may be a column that has an open bottom. In other words, the column-less column allows for at least a portion of the received tower/mast to extend downwardly and out of the open bottom.

SI-VAM is a Floating Offshore Wind Platform which involves a combination of a column-less centre column with top and bottom interconnecting structure. The unique column-less centre column may serve multiple functions, as described in more details in the accompanying figures.

DETAILED DESCRIPTION

Figure 1A:
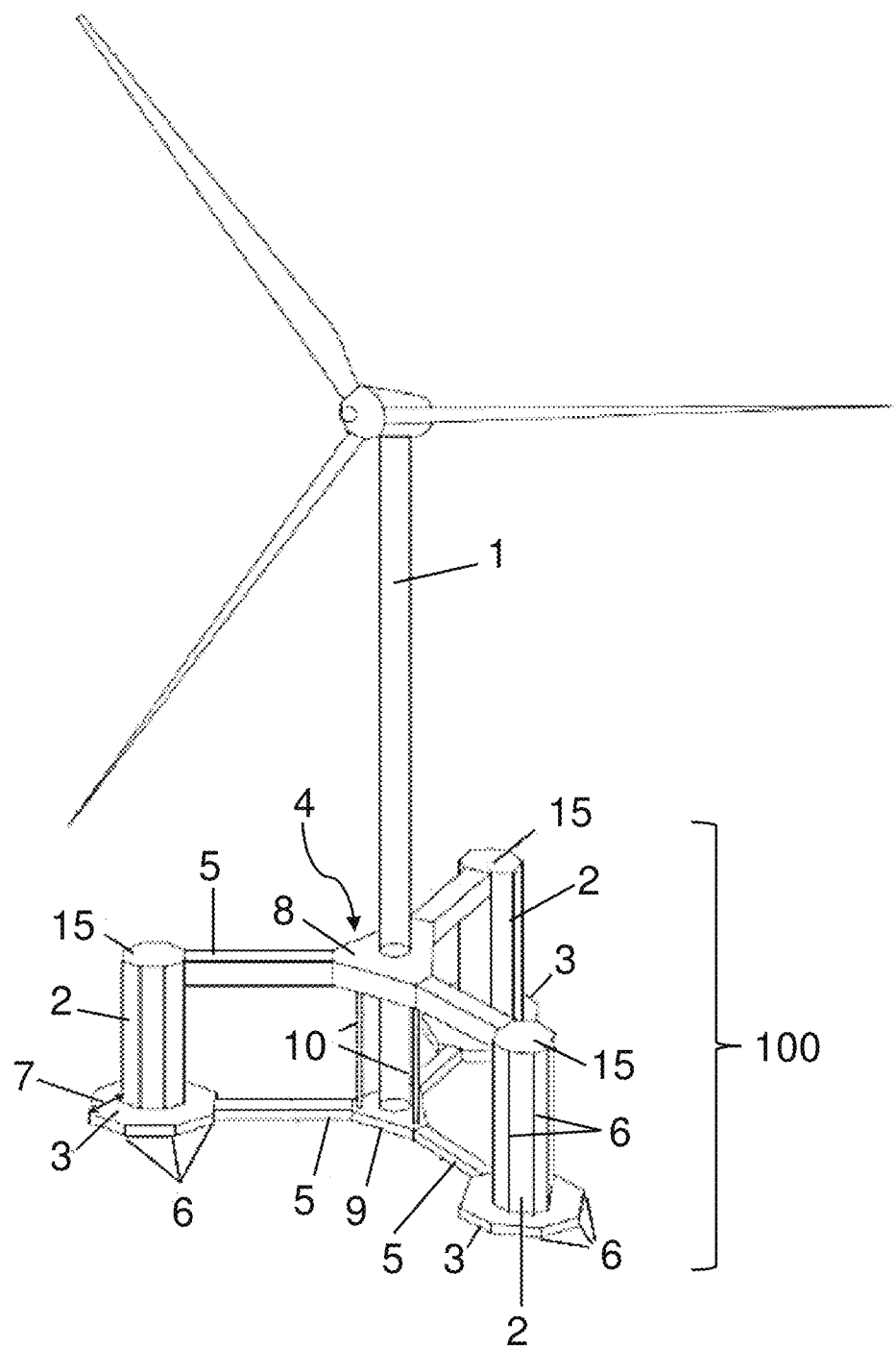
FIG. 1A shows a perspective schematic view of an embodiment of a SI-VAM, with a wind turbine received and extending therefrom where columns are in the concentric position/arrangement.

In the following description, numerous specific details are set forth in order to provide a thorough understanding of various illustrative embodiments of the invention. It will be understood, however, to one skilled in the art, that embodiments of the invention may be practiced without some or all of these specific details. Embodiments described in the context of one of the methods or devices are analogously valid for the other methods or devices. Similarly, embodiments described in the context of a method are analogously valid for a device, and vice versa.

Unless defined otherwise, all technical and scientific terms used herein have the meaning commonly understood by a person skilled in the art to which this invention belongs.

The terms "about", "approximately", "substantially" must be read with reference to the context of the application as a whole, and have regard to the meaning a particular technical term qualified by such a word usually has in the field concerned. For example, it may be understood that a certain parameter, function, effect, or result can be performed or obtained within a certain tolerance, and the skilled person in the relevant technical field knows how to obtain the tolerance of such term.

The phrase "at least one of A and B" means it requires only A alone, B alone, or A and B, i.e. only one of A or B is required.

Modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

As used herein, the articles "a", "an" and "the" as used with regard to a feature or element include a reference to one or more of the features or elements. As used herein, the term "and/or" includes any and all combinations of one or more of the associated listed items. As used herein, the terms "first," "second," and "third," etc. are used merely as labels, and are not intended to impose numerical requirements on their objects. As used herein, the terms "top", "bottom", "left", "right", "side", "vertical" and "horizontal" are used to describe relative arrangements of the elements and features. As used herein, the term "each other" denotes a reciprocal relation between two or more objects, depending on the number of objects involved.

Ranges may be expressed herein as from "about" one particular value, and/or to "about" another particular value. When such a range is expressed, a further aspect includes from the one particular value and/or to the other particular value. Similarly, when values are expressed as approximations, by use of the antecedent "about," it will be understood that the particular value forms a further aspect. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. It is also understood that each unit between two particular units are also disclosed. For example, if 10 and 15 are disclosed, then 11, 12, 13, and 14 are also disclosed.

The word "substantially" does not exclude "completely" e.g. a composition which is "substantially free" from Y may be completely free from Y. Where necessary, the word "substantially" may be omitted from the definition of the invention.

Although each of these terms has a distinct meaning, the terms "comprising", "consisting of" and "consisting essentially of" may be interchanged for one another throughout the instant application. The term "having" has the same meaning as "comprising" and may be replaced with either the term "consisting of" or "consisting essentially of".

Terms such as "coupled", "connected", "attached", "conjugated and "linked" are used interchangeably herein and encompass direct as well as indirect connection, attachment, linkage or conjugation unless the context clearly dictates otherwise. The coupling of two components may refer to the two components being fixed, welded, or fastened directly or indirectly, removably or non-removably.

By "polygonal", it refers to a surface having three or more sides or a three-dimensional object having three or more side surfaces in addition to the top and bottom surfaces. Examples of polygonal shapes that may be used include triangular, quadrilateral, pentagonal, hexagonal, heptagonal, octagonal, nonagonal, decagonal and so forth.

The buoyant structure 100 may have an upper (first) deck 8, a lower (second) deck 9, and a plurality of floatable substructures coupled to and around at least one of the upper deck 8 and lower deck 9. The upper deck 8 and lower deck 9 are coupled to each other and arranged spaced apart from each other vertically. The coupling of the upper deck 8 and lower deck 9 may be direct or indirect as explained in greater detail below. The floatable substructures are arranged spaced apart from each other and is explained in greater detail below. The intent is to achieve a robust, stable, and optimized design in terms of weight saving and better motion characteristic.

The upper deck 8 and lower deck 9 each have a channel through its deck (which are through opposing surfaces of the deck, for example from the top surface through to the bottom surface of the deck). The channels are open-ended at both ends to allow the tower 1 to pass through the channel and decks 8, 9. When deployed in the sea or other body of water, the lower deck 9 will be submerged in the water and water is able to flow through the channel of the lower deck 9. The channels of the upper deck 8 and lower deck 9 are aligned to form a third continuous channel to receive at least a portion of a tower 1 of a wind turbine. Thus, the third channel is made up of the channels of the upper deck 8, lower deck 9 and a channel between the decks 8, 9. The buoyant structure 100 may have a central axis in the vertical direction as seen when the buoyant structure is in use. The central axis may be in the middle of the third channel parallel to the longitudinal axis of the third channel and by necessity the channels of the upper deck 8 and lower deck 9. In an embodiment, the central axis may be co-axial with the longitudinal axis of the third channel. In another embodiment, the central axis is parallel but not aligned to the longitudinal axis of the third channel in an off-centre alignment. The tower 1 may be coupled to the buoyant structure 100 by an attachment means or a fixation system that allows the tower to be secured to the buoyant structure 100. As an example, during operating conditions of the buoyant structure 100 with the wind turbine, the tower 1 may be flushed with the bottom of the lower deck 9. However, during installation or maintenance, the tower 1 may be displaced beyond (for example below) the buoyant structure 100 due to the lowered height of the wind turbine.

A support element 10 may be optionally provided to directly couple the upper deck 8 and lower deck 9. Examples of a support element include a rod including a plurality of rods, a lattice frame, a beam and a wall. The support element 10 is preferably arranged around the perimeter or edge of the bottom surface of the upper deck 8 and top surface of the lower deck 9. It will be appreciated that the top surfaces of the upper deck 8 and lower deck 9 are relative and face in the same direction, and similarly for the bottom surfaces of the upper deck 8 and lower deck 9. Thus, the top surface of the upper deck 8 is a surface facing away from the second deck while the bottom surface of the upper deck 8 faces the top surface of the lower deck 9. Advantageously, this provides additional structural integrity and depends on the requirements of the load (e.g. the wind turbine) to be carried by the buoyant structure 100. Additionally, the support element 10, for example the plurality of rods improves the structural integrity of the buoyant structure and allows for a shorter span between the decks 8,9 and floatable substructure.

In an embodiment, the support element 10 is a continuous wall (for example a wall with a circular horizontal cross-section or an ellipsoidal horizontal cross-section) and the portion of the third channel between the upper deck 8 and lower deck 9 may have the wall surrounding the middle portion of the third channel, it will be appreciated that the wall will not close the two end portions to allow the tower 1 to be received in the channels. The wall may extend from bottom surface of the upper deck 8 to the top surface of the lower deck 9, with the bottom surface of the upper deck 8 facing the top surface of the lower deck 9. The wall may also be considered as a hollow cylinder with open ends. The upper deck 8, lower deck 9 and third channel may be termed a column-less column 4. Preferably, the upper deck 8, lower deck 9 and third channel and thus the column-less column 4 are in the centre of the buoyant structure 100.

Advantageously, the column-less column 4 reduces the water plane area in the centre of the buoyant structure 100 providing better motion characteristics while reducing the weight and material usage of the buoyant structure, in particular reducing the overall steel weight used. Further, it increases space availability for other uses and improves motion response while reducing the amount of steel used.

The floatable substructures may be coupled to at least one of the upper deck 8 and lower deck 9, preferably both. The floatable substructures may be arranged spaced apart from one another and around the coupled deck (either or both of the upper deck 8 and lower deck 9) and are preferably equidistant from each other. There are preferably at least three floatable substructures. The attachment of the plurality of floatable substructures to the upper deck 8 and/or lower deck 9 by the connecting elements 5 allows at least the upper deck 8 of the buoyant structure 100 to be above the water line 21 while the lower deck 9 may be submerged in the water when the tower 1 is received in the buoyant structure. It will be appreciated that in the absence of the tower 1, the relative position of the decks 8, 9 may differ depending on the dimensions. The floatable substructures may be arranged around at least one of the upper deck 8 and lower deck 9 in a radial manner and extends outwardly from the coupled deck. Thus, such radial coupling may be viewed as a hub and spoke with the decks 8, 9 as the hub and the floatable substructures as the end of the spokes.

Each floatable substructure may comprise an elongate column 2 and a pontoon 3. Preferably, either or both the elongate column 2 and pontoon 3 may have a polygonal horizontal cross-section. Advantageously, the polygonal horizontal cross-section of the elongate column 2 and pontoon 3 (i.e. bended radius of straight plate and vertices 6) provides for ease of fabrication from the constructability point of view. The elongate column 2 and pontoon 3 may each have a polygonal horizontal cross-section with vertices 6 between the edges. The elongate column 2 and pontoon 3 may also be viewed as being polygonal in shape by virtue of its polygonal horizontal cross-section, and thus may be termed as a polygonal elongate column 2 and a polygonal pontoon 3 herein. The polygonal cross-section for both the elongate column 2 and pontoon 3 may have three or more edges, preferably three to ten edges. In an embodiment, the polygon has eight edges. Thus, the polygonal shapes that may be used include triangular, quadrilateral, pentagon, hexagon, heptagon, octagon, nonagon, decagon and so forth. The polygonal shape may be a regular polygon (in other words the angles of the polygon are equal and have all the sides have the same length). In an embodiment, the elongate column 2 has a top region and a bottom region opposite to the top region, and the pontoon 3 is coupled to the bottom region of the elongate column 2. The top region of the elongate column 2 may be coupled to the upper deck 8. The lower deck 9 may be coupled to the pontoon 3. In an embodiment, the upper deck 8 is also coupled to the pontoon 3.

Optionally, the top surface of the upper deck 8 is flush with the top surface 15 of the floatable structure which may be the top surface 15 of the elongate column 2. The top surfaces of the upper deck 8 and floatable structure or elongate column 2 are arranged substantially along the same plane and may be termed a deck plane 22. A top surface of the connecting element 5 coupling the upper deck 8 and floatable structure or elongate column 2 may also be flush with the deck plane 22. Optionally, the bottom surface of the lower deck 9 is flush with the bottom surface of the floatable structure which may be the pontoon 3. The bottom surfaces of the floatable structure or pontoon 3 and lower deck 9 are arranged substantially along the same plane and may be termed a keel plane 24. Further, the bottom surface of the connecting element 5 coupling the lower deck 9 and floatable surface or pontoon 3 may also be flush with the keel plane. Preferably, the top surfaces of the pontoon 3, lower deck 9 and connecting element 5 are also on the same pontoon deck plane 23.

The polygonal elongate column 2 and pontoon 3 have been shaped such that there is a significant reduction in the amount of construction workload resulting in mass production at the same time improving fatigue life. The amount of material wastage has also been significantly reduced.

Another advantageous feature of the embodiments is the option to have an eccentric column centre for the floatable substructure instead of concentric to further enhance the stability performance. This makes the embodiments easily scalable from a benign to a harsh environment, and from a lower megawatt (MW) to a higher megawatt turbine installation. In a concentric column arrangement, the elongate column 2 is coupled to a substantially centre region of the pontoon 3 (for example, proximal to or at the centre of the pontoon). In an eccentric arrangement, the elongate column 2 is coupled to a substantially off-centre region of the pontoon 3 (for example, proximal to an edge or between the edge and centre of the pontoon 3).

A plurality of connecting elements 5 (i.e. an inter-connecting structure) may be provided to couple the floatable substructures to the upper deck 8 and/or lower deck 9. The connecting elements 5 may also indirectly couple the upper deck 8 to the lower deck 9 as evident in one of the embodiments described herein. Examples of connecting elements include a rod and a beam. The connecting element 5 may be used to couple the upper deck 8 to a top region of the elongate column 2, with the bottom region of the elongate column 2 attached to the pontoon 3. The connecting element 5 may be used to couple the lower deck 9 to the pontoon 3. A diagonal connecting element 5 may also be used to couple the upper deck 8 to the pontoon 3.

The upper deck 8 and lower deck 9 may be coupled together directly by the support element 10 or indirectly by the connecting elements 5 and struts 11 as will be evident from the figures and description herein.

Figure 2A:
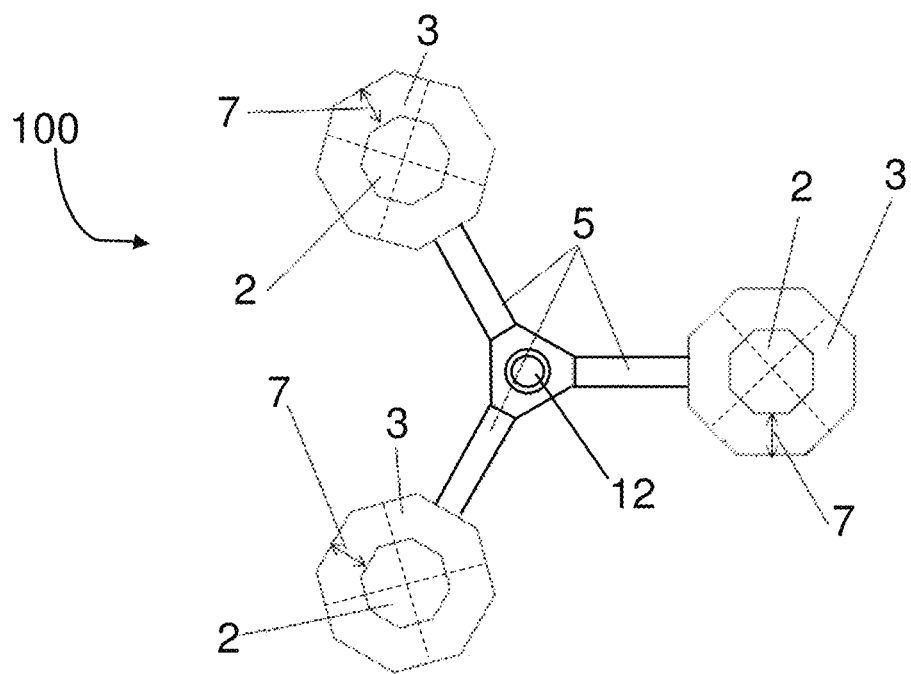
FIG. 2A shows a top schematic view of the embodiment of FIG. 1A where the columns are in the concentric position/arrangement.

FIG. 1A shows a perspective view of an embodiment of the buoyant structure 100 with a wind turbine received in the buoyant structure 100, in particular received in the channels of the buoyant structure 100. FIG. 2A shows a top plan view of the embodiment in FIG. 1A without the tower. In FIG. 1A, the upper deck 8 has a channel passing from the top to the bottom surface of the upper deck 8 and may be viewed as a first channel, i.e. a hole through the upper deck 8 that forms the channel of the upper deck 8. Similarly, the lower deck 9 has a channel passing from the top to the bottom surface of the lower deck 9 and may be viewed as a second channel. The channels of the upper deck 8 and lower deck 9 are aligned to receive a tower 1 (may also be called a mast) of a wind turbine. The channels of the upper deck 8 and lower deck 9 along with the intervening space between the upper deck 8 and lower deck 9 may be viewed as forming a third channel. The upper deck 8, lower deck 9 and channels may also be termed a "column-less" centre column 4 as the centre portion is hollow to receive the tower 1. The channels may be viewed more clearly without the tower 1 in another embodiment shown in FIG. 3A. It would be appreciated that the upper deck 8 and lower deck 9 may be identical or non-identical in size, shape, and cross-section. For example, the upper deck 8 may be thicker than the lower deck 9 as more equipment may need to be installed on the upper deck 8. In addition, a central axis of the buoyant structure 100 may be present in the middle and parallel and co-axial (or coincident) with the longitudinal axis of the third channel 12 (and also the channels of the upper deck 8 and lower deck 9).

In FIG. 1A, the support element 10 comprises three rods (or pillars) 10 each located at the intersection of the connecting element 5 and decks 8, 9. The upper deck 8 may be coupled to the elongate column 2 by a connecting element 5, for example a beam or a bar, and the lower deck 8 may be similarly coupled to the pontoon 3.

In FIGS. 1A and 2A, the embodiment has three floatable substructures each connected to the upper deck 8 and lower deck 9. The third channel 12 (which is formed by the channels of the upper deck 8, lower deck 9 and channel between the decks 8, 9) contains the central axis of the buoyant structure 100 along its longitudinal side or long side, and also preferably passes through the centroid of the deck plane and keel plane. The three floatable substructures may be arranged equidistant from each other such that each floatable substructure may be viewed as an end of an equilateral triangle. The embodiment further contains thee support elements 10 each placed proximal to the intersection of the connecting element 5 and upper and lower decks 8, 9.

In FIGS. 1A and 2A, the elongate column 2 and pontoon 3 each has a polygonal horizontal cross-section with vertices 6 between the edges, in particular a octagonal horizontal cross-section. The elongate column 2 and pontoon 3 may also be viewed as being polygonal (specifically an octagon) in shape by virtue of its polygonal horizontal cross-section. In the embodiment, the elongate column 2 is coupled at a substantially centre region of the pontoon 3 (as indicated by the dashed lines) as most clearly seen in FIG. 2A with a substantially uniform spacing 7 between the edge of the elongate column 2 and pontoon 3. The placement of the elongate column in the substantially centre region of the pontoon 3 may be termed a concentric arrangement.

The tower 1 may be coupled to the buoyant structure 100 by an attachment means or a fixation system that allows the tower to be secured to the buoyant structure 100. As an example, during operating conditions of the buoyant structure 100 with the wind turbine, the tower 1 may be flushed with the bottom of the lower deck 9 (i.e. flushed with the keel plane as explained below and shown in FIG. 3B). However, during installation or maintenance, the tower 1 may be displaced beyond (for example below) the buoyant structure 100 due to the lowered height of the wind turbine.

Figure 1B:
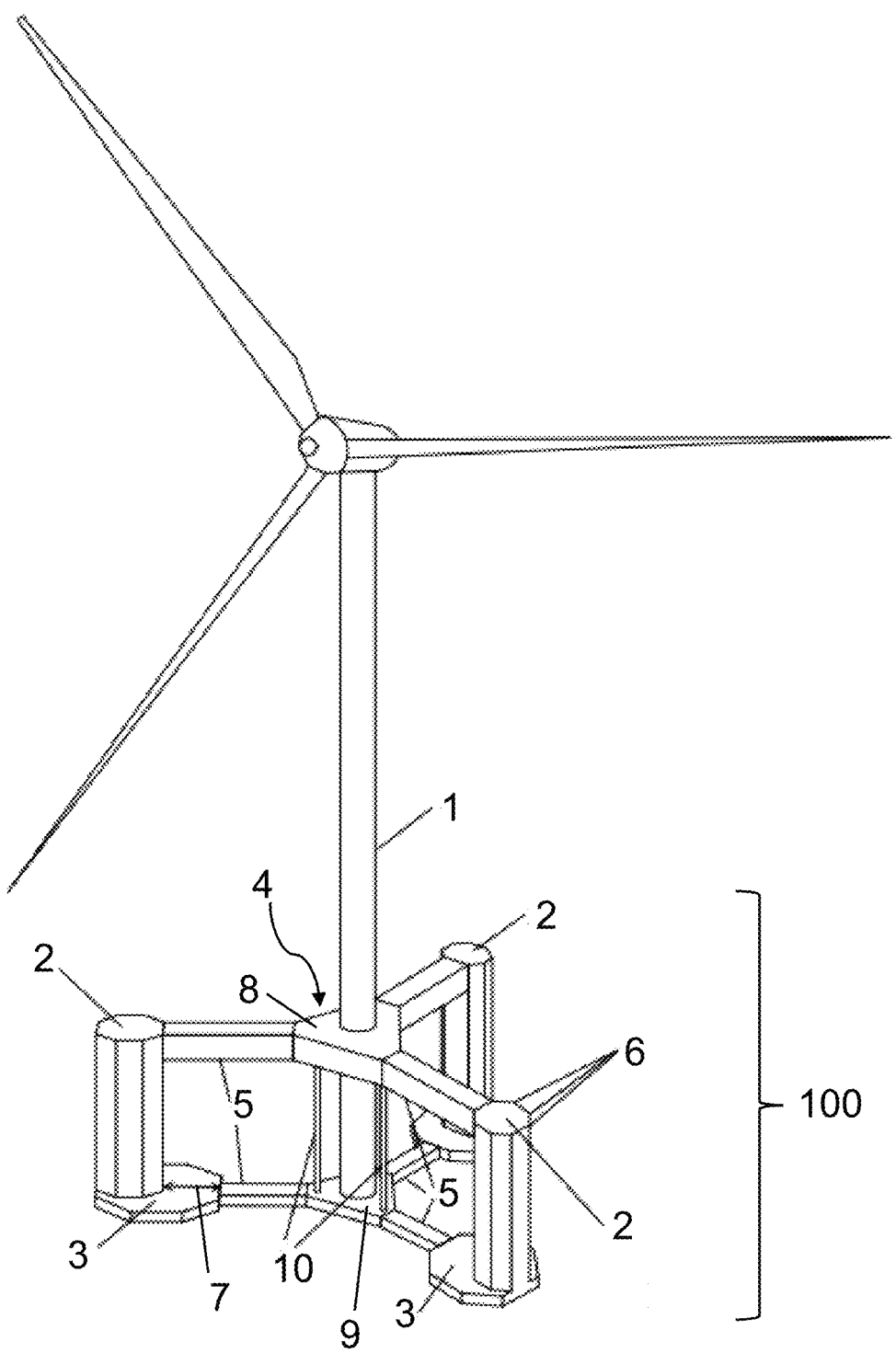
FIG. 1B shows a perspective schematic view of an embodiment of a SI-VAM similar to FIG. 1A but where columns are in an exemplary eccentric position/arrangement. It should be appreciated that other eccentric positions/arrangements of the columns are possible.
Figure 2B:
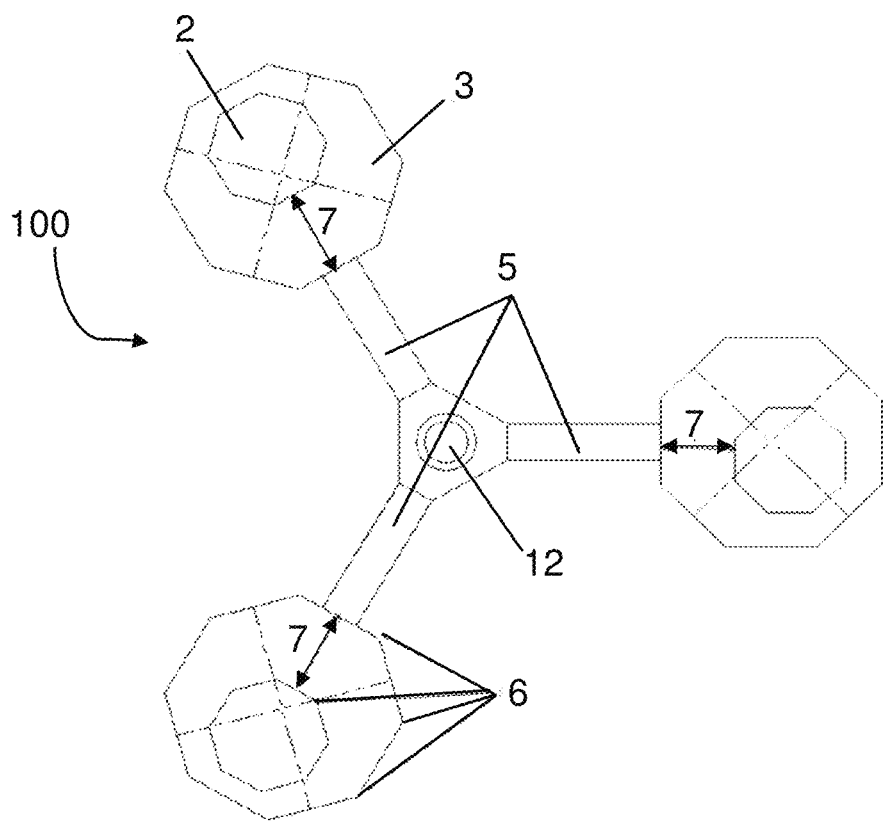
FIG. 2B shows a top schematic view of the embodiment of FIG. 1B where the columns are in the eccentric position/arrangement. Similarly, it should be appreciated that other eccentric positions/arrangements of the columns are possible.

FIGS. 1B and 2B show a perspective view and top plan view of another embodiment of the buoyant structure 100. The difference between this embodiment and that shown in FIGS. 1A and 2A is that the elongate column 2 is coupled to the pontoon 3 at a substantially off-centre region or proximal to an edge on the pontoon as may be seen in FIGS. 1B and 2B. Thus, the spacing 7 between the edge of the elongate column 2 and edge of the pontoon 3 is not uniform. In an embodiment, the spacing 7 is larger at the side of the elongate column 2 facing the connecting element 5 as shown in FIG. 2B. The other features of the upper deck 8, lower deck 9, connecting elements 5 and support element 10 are the same as that described for FIG. 1A. It may be seen in FIG. 2B that the elongate column 2 is located mostly in one of the quadrants indicated by the dashed lines and the central longitudinal and vertical axis of the elongate column 2 is no longer co-axial with the centre of the pontoon 3. This is termed an eccentric arrangement. The placement of the elongate column 2 at a substantially off-centre region may be termed an eccentric arrangement. Advantageously, the eccentric elongate column 2 and pontoon 3 arrangement enhance the stability performance of the buoyant structure 100. The different available arrangements of elongate column 2 on the pontoon 3 makes the embodiments easily scalable from a benign to a harsh environment, and from a lower megawatt to a higher megawatt turbine installation.

Hence, the placement of the elongate column 2 may be adjusted according to the operating location of the buoyant structure 100.

Figure 3A:
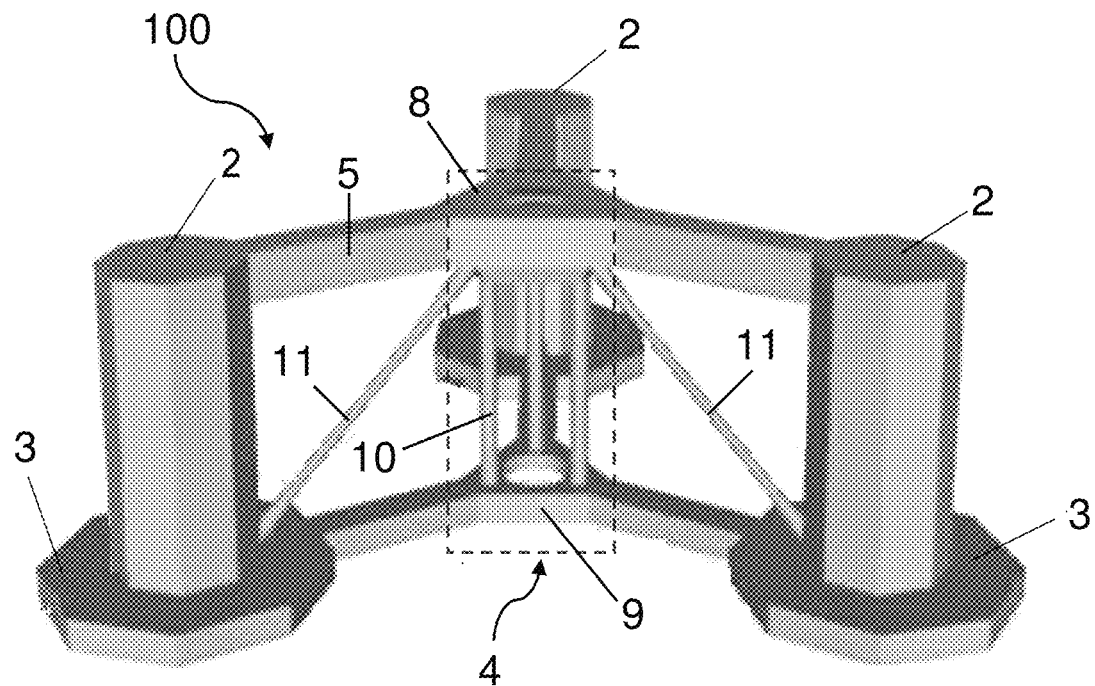
FIG. 3A shows a perspective schematic view of another embodiment, in the absence of the wind turbine.

FIG. 3A shows a perspective view of an embodiment similar to the embodiment in FIG. 1A in the absence of the tower 1. The embodiment in FIG. 3A has additional struts 11 between the upper deck 8 and pontoon 3 to couple them together. The strut 11 may couple to the bottom region of the elongate column 2 or the pontoon 3 either alone or in combination.

Figure 3B:
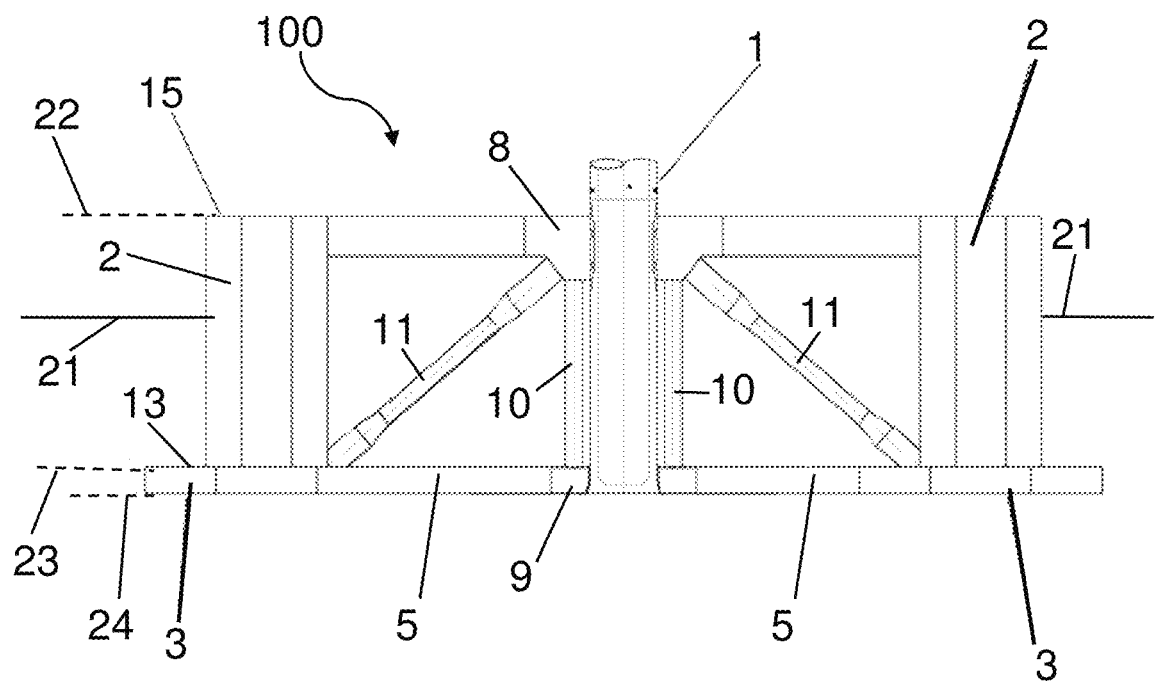
FIG. 3B shows a cross-sectional side schematic view of the embodiment of FIG. 2A.

FIG. 3B shows a side cross-section view of the embodiment in FIG. 3A with a tower received in the third channel 12. It may be seen that when the tower 1 is received in the buoyant structure 100, the buoyant structure 100 is partially submerged with the lower deck 9 below the water line 21 and immersed in the water, while the upper deck 8 is above the water line 21 and equipment and personnel may be located. In the embodiments shown in FIGS. 1A, 1B, and 3A, the top surface 15 of the elongate column 2 (and by necessity the floatable structure), top surface of the connecting element 5 between the top region of the elongate column and the upper deck 8, and top surface of the upper deck 8 are substantially on the same deck plane 22. The bottom surface of the pontoon 3 (and by necessity the floatable structure), bottom surface of the connecting element 5 between the pontoon 3 and the lower deck 9, and bottom surface of the lower deck 9 are substantially on the same keel plane 24. Further, the top surface 13 of the pontoon 3, top surface of the connecting element 5 between the pontoon 3 and the lower deck 9, and top surface of the lower deck 9 are substantially on the same pontoon deck plane 23.

Figure 4:
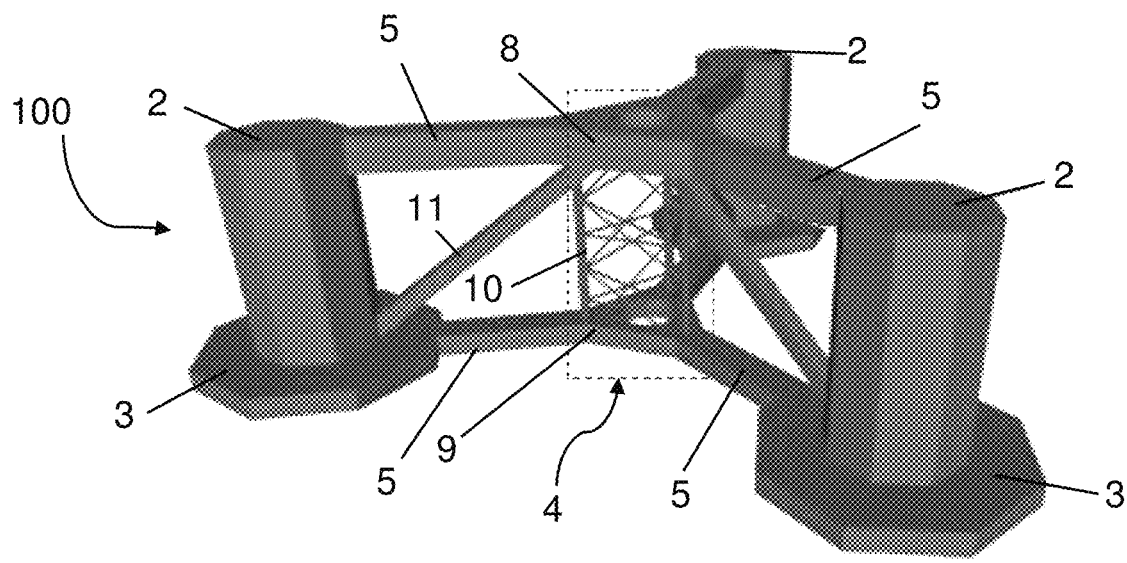
FIG. 4 shows a perspective schematic view of an embodiment with a different column-less centre column.

FIG. 4 shows a perspective view of a similar embodiment to that in FIG. 3A. The difference between the two embodiments is that in FIG. 4 the support element 10 is a lattice frame 10 rather than the three rods in the embodiment in FIG. 3A. The lattice frame 10 generally comprises a network of rods including a plurality of vertical rods, horizontal rods and diagonal rods. In FIG. 4, the lattice frame 10 comprises three vertical rods with a plurality of horizontal and diagonal rods between the three vertical rods. However, any appropriate lattice frame may be used as the support element 10.

Figure 5:
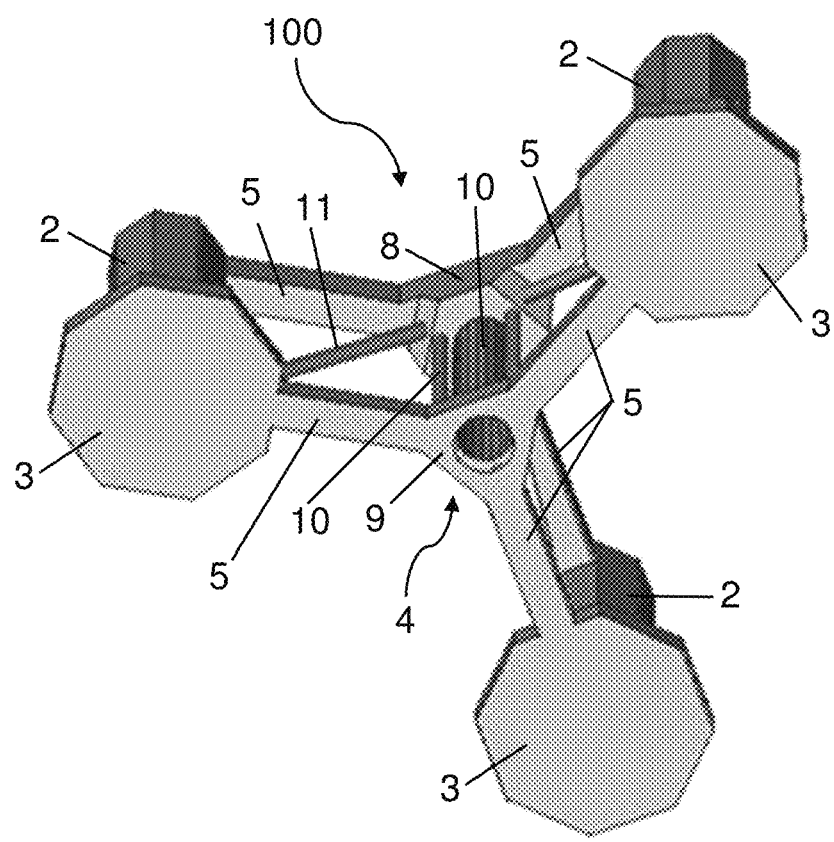
FIG. 5 shows a perspective schematic view of an embodiment with a different column-less centre column.

FIG. 5 shows a perspective of a similar embodiment to that in FIG. 3A but viewed from the bottom (or pontoon 3 side). In the embodiment in FIG. 5, the support element 10 comprises the three vertical rods (as in FIG. 3A) and additionally a circular wall coupling the upper deck 8 and lower deck 9. The wall surrounds the middle portion of the third channel 12 between the upper deck 8 and lower deck 9. The wall and channel may be viewed as a hollow cylindrical shell with both ends open to receive the tower 1.

Figure 6A:
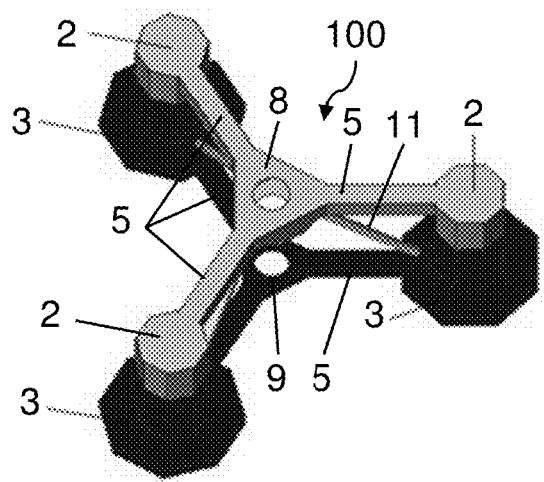
FIG. 6A shows a perspective schematic view of an embodiment without a centre support.
Figure 6B:
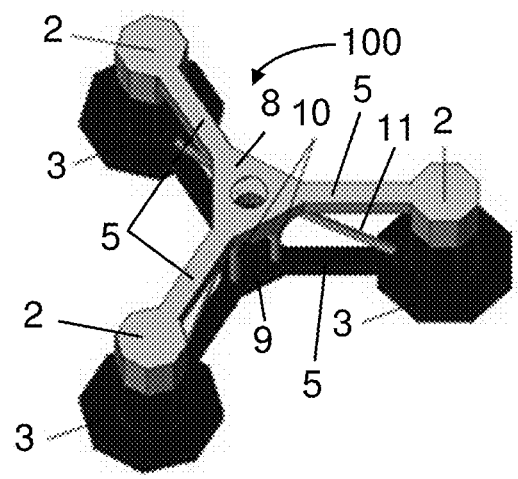
FIG. 6B shows a perspective schematic view of an embodiment with a centre support for comparison purposes with FIG. 6A.

FIGS. 6A and 6B shows a comparison of two embodiments without and with the support element 10 respectively. FIG. 6B shows the embodiment in FIG. 3A from a different perspective. In both FIGS. 6A and 6B, the darker lower portion of the buoyant structure illustrates the water line due to the operating draft. In other words, the darker regions of the buoyant structure 100 may be submerged in the water at the operating draft. In FIG. 6A, the embodiment does not have a support element 10 to couple the upper deck 8 and lower deck 9 directly. The upper deck 8 and lower deck 9 are instead coupled indirectly by the connecting elements 5. In FIG. 6A, the connecting elements 5 comprises three beams 5 between the upper deck 8 and the top region of the elongate columns 2, three beams 5 between the lower deck and the pontoons 3, and three diagonal struts between the upper deck 8 and the pontoons 3 (or alternatively the lower region of the elongate column 2). The additional support element 10 (for example three vertical rods as shown in FIG. 6B) in the embodiment in FIG. 6B may improves the structural integrity of the buoyant structure 100 compared to the embodiment in FIG. 6A and leads to a shorter span (and connecting element 5) between the decks 8, 9 and floatable substructure (e.g. upper deck 8 and elongate column 2, and lower deck 9 and the pontoon 3). Advantageously, this reduces the amount of material needed and reduces the weight of the buoyant structure.

Figure 7:
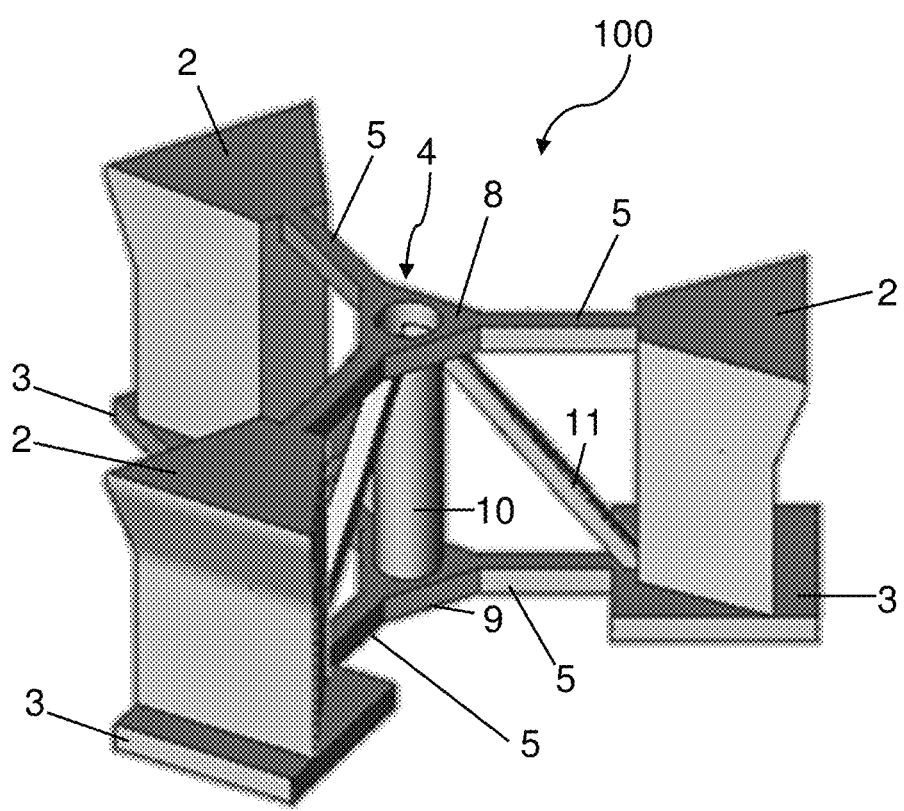
FIG. 7 shows a perspective schematic view of an embodiment with a trapezoidal shaped elongate column.

FIG. 7 shows a perspective view of an embodiment with a floatable substructure having a quadrilateral shaped (in other words a quadrilateral horizontal cross-section) elongate column 2 and pontoon 3, specifically a trapezoidal shaped elongate column 2 and a substantially square or rectangular shaped pontoon 3. The elongate column 2 has a trapezoidal horizontal cross-section when viewed from the top. Preferably, the top portion of the elongate column 2 that couples to the upper deck 8 is larger than the bottom portion of the elongate column 2 that sits on the pontoon 3. In the embodiment shown in FIG. 7, the trapezoidal shaped cross section has one pair of parallel sides with the shorter side of the trapezoid being coupled to the connecting element 5 and faces the centre of the buoyant structure 100. The longer side of the parallel sides faces outwards of the buoyant structure 100. The pontoon 3 may have a rectangular horizontal cross-section which includes a square horizontal cross-section, or may other polygonal cross-section as described herein. The connecting elements 5 of the embodiment in FIG. 7 couple the upper deck 8 to the elongate column 2 and the lower deck 9 to the pontoon 3, other configurations as described herein may be used as well. In addition, struts 11 couple the upper deck 8 to the pontoon 3. The support element 10 may be a circular wall coupling the upper deck 8 and lower deck 9 and may be viewed as a hollow cylindrical shell with both ends open to receive the tower 1.

Figure 8:
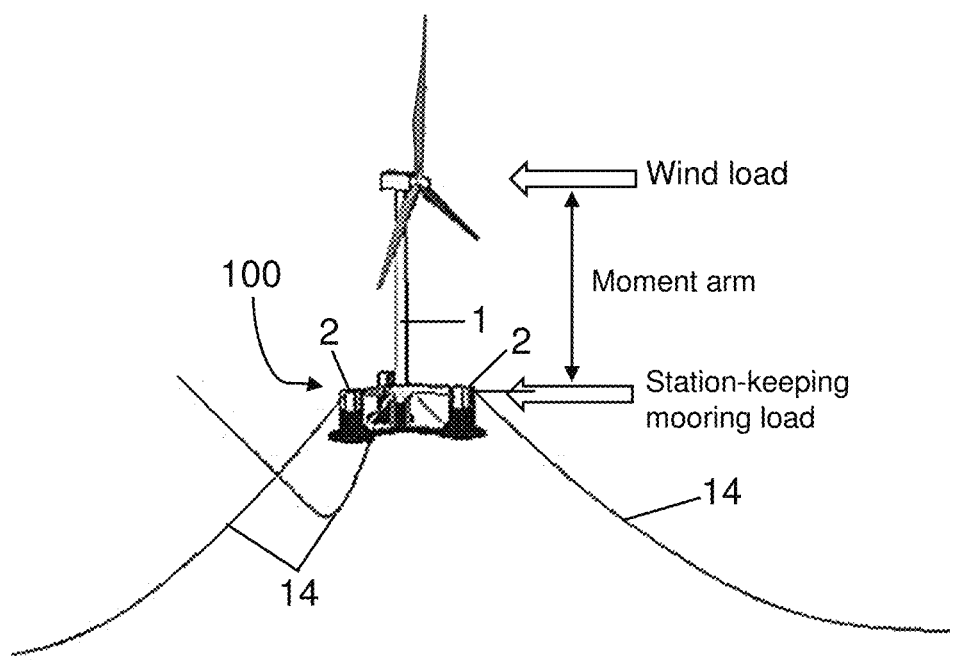
FIG. 8 shows a schematic on the embodiment in FIG. 1A and the forces acting on the design.

FIG. 8 shows a perspective view of the buoyant structure 100 with the wind turbine and a mooring system. The buoyant structure 100 may contain a plurality of anchoring points for mooring the buoyant system, preferably at least three anchoring points. The anchoring points may be located on the top region of the elongate column 2. An example mooring system may be a cost-effective three-line 14 concept with a spread catenary mooring design. A drag anchor was used for the embodiment, but other types of anchor may also be used. A fairlead connection may be used at the deck of the buoyant structure 100 to enhance stability against wind-induced overturning moment. As may be seen in FIG. 8 the force of the wind load acts on the wind turbine and the force of the station-keeping mooring load acts on the buoyant structure 100 and creates a moment arm.

Figure 9:
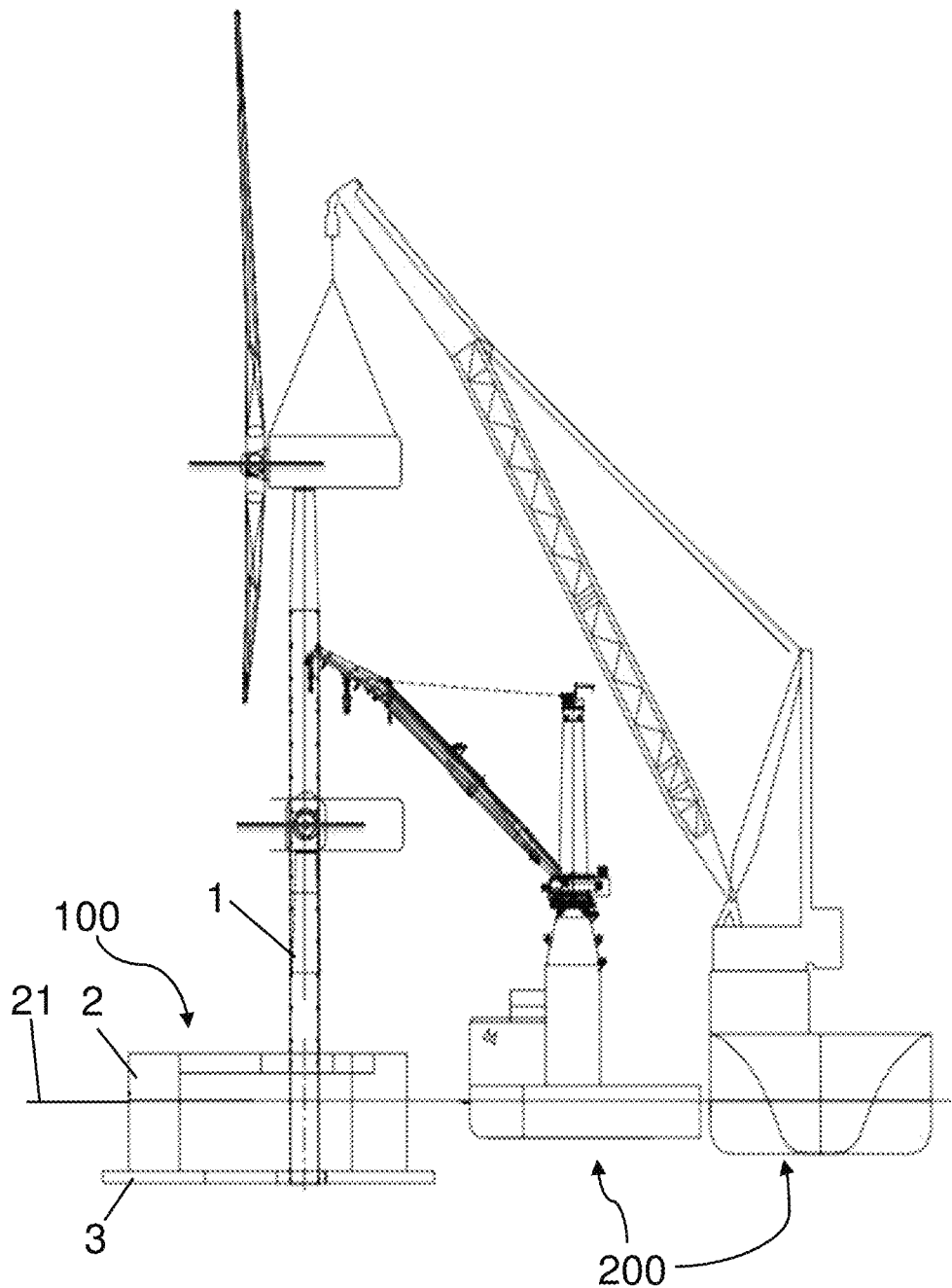
FIG. 9 shows a side cross sectional view of the embodiment in FIG. 1A with installation or maintenance works being performed.

FIG. 9 shows a side cross section view of the buoyant structure 100 deployed in a body of water. An installation vessel 200 or maintenance vessel 200 may be used to install the wind turbine or to perform maintenance work on the buoyant structure 100 and wind turbine.

The buoyant structure 100 may be provided with a jacking module configured to raise and lower the tower 1 through the first channel, second channel and third channel 12. The jacking module may be used to lower the tower during maintenance and provides for a reduced installation and maintenance height. This reduces the work at height risk and the expected operating expenses (OPEX). Further, the jacking module reduces the dependency on a large crane capacity installation vessel and thus can lead to greater cost savings and efficiencies. As an example, the jacking module may be a portable unit that may be deployed with the buoyant structure 100 during installation or maintenance work. An interface structure or platform may be provided on the upper deck 8 to allow the jacking module to be securely used with the buoyant structure 100. Alternatively, the jacking module may be integrally built with the buoyant structure 100, for example on the upper deck 8.

An example of wind turbine that may be used is the GE Haliade X wind turbine with a capacity of 12 to 14 MW as shown in Table 1.

TABLE 1

Characteristics of a wind turbine that may be used with the buoyant structure 100

| Characteristic | Specification Value |
|---|---|
| Rotor diameter (m) | 220 (Annotation 2 on the right) |
| Blade length (m) | 107 |
| Swept area (m$^2$) | 38,000 |
| Cut-in wind speed (m/s) | 3.5 |
| Cut-out wind speed (m/s) | 28 |

Figure 10A:
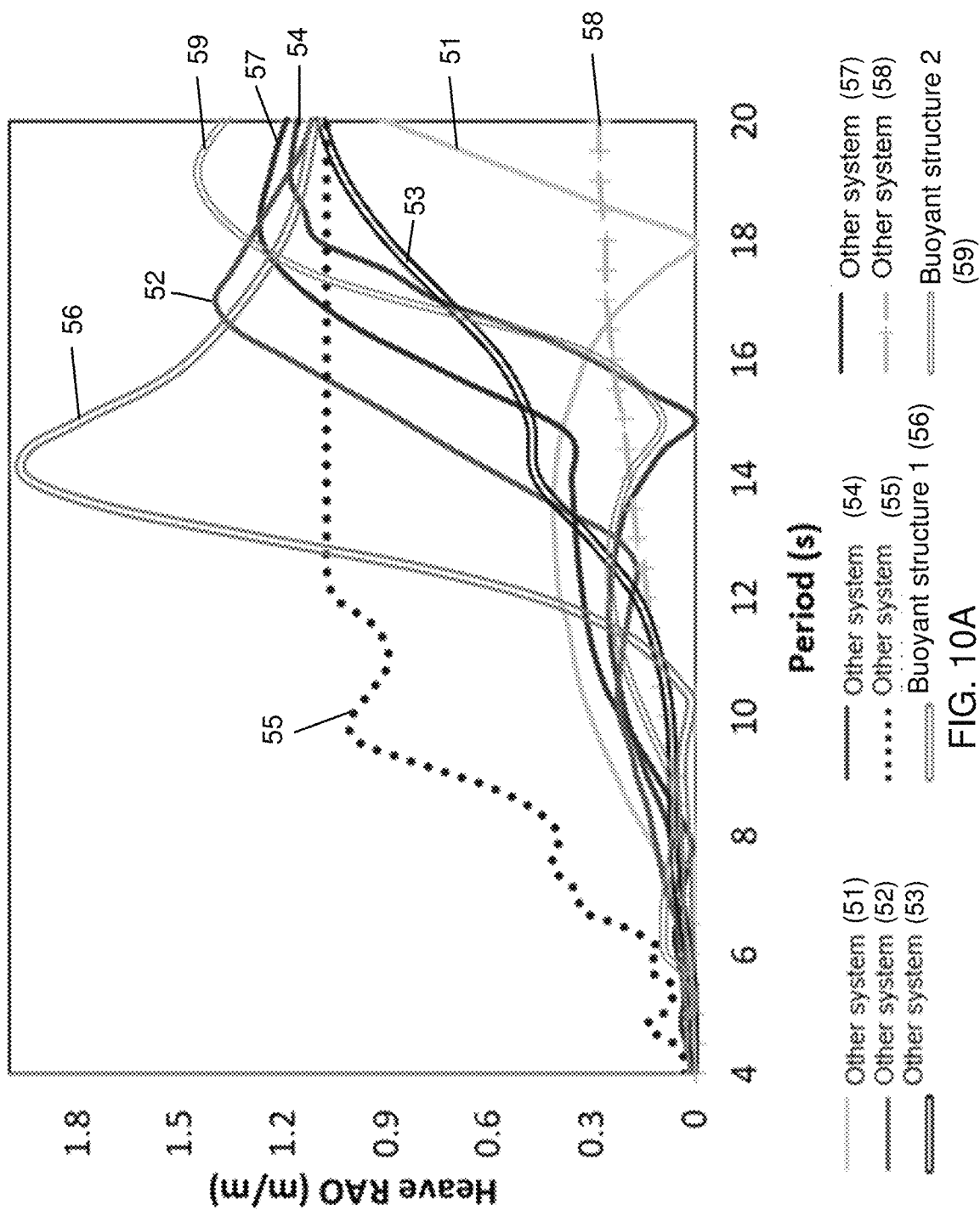
FIGS. 10A and 10B show a comparison of the heave and pitch of the embodiments herein and existing systems.
Figure 10B:
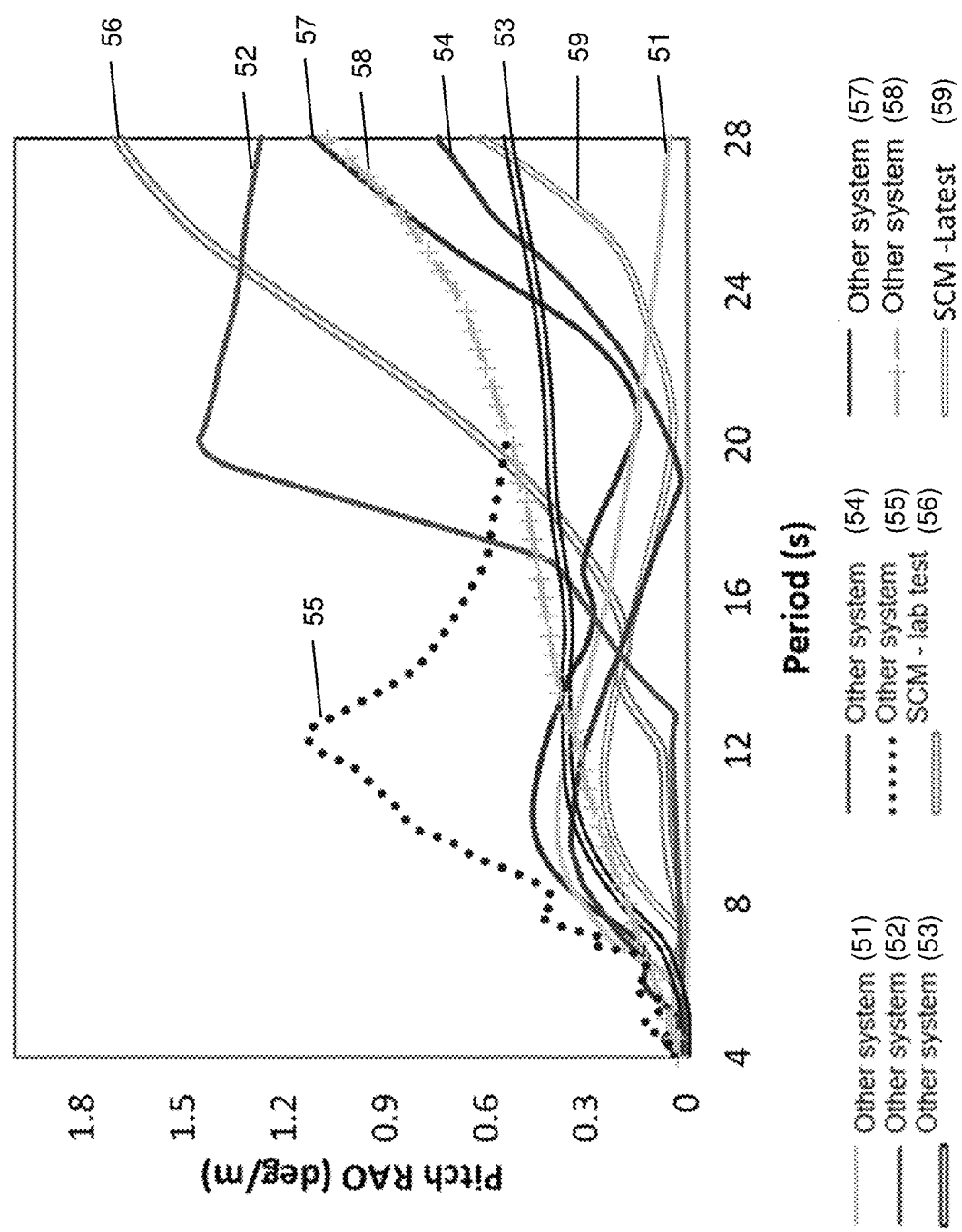

FIGS. 10A and 10B compares the motion characteristics of two embodiments of the buoyant structure 100 and other systems. FIG. 10A shows the heave response amplitude operator (RAO) over time (period). FIG. 10B shows the pitch response amplitude operator (RAO) over time. The RAO data for the buoyant structure 100 may be obtained from the aqwa software. The RAOs are obtained based on a buoyant structure 100 for a 12 MW wind turbine at moderate environmental conditions. The RAO data for the existing buoyant structures were obtained from the public domain but may have be based on different turbine power settings.

Lines 56 and 59 show the heave performance of the embodiment of the buoyant structure shown in FIGS. 7 and 1A respectively compared to other systems, and it may be observed that the embodiments of the buoyant structure 100 described provides better motion characteristics than existing systems. The heave and pitch characteristics may depend in part on the environmental conditions where the buoyant structure 100 is deployed. This results in the wind turbine assembly of the buoyant structure 100 and wind turbine having higher operability as the wind turbine assembly may be able to withstand harsher conditions than existing systems.

All wind turbines and their assembly have a maximum pitch and/or heave angle under which it can operates. If the sea conditions are harsh and the wind turbine assembly exceed the maximum angle, the wind turbine stops operating. By having better heave and pitch characteristics than existing systems, the buoyant structures 100 descried herein are able to operate under harsher conditions and maximise the operating time of the wind turbine.

TABLE 2

Steek weight comparison between buoyant structure 100 and existing systems

| | Units | Buoyant structure described herein | System A | System B | System C |
|---|---|---|---|---|---|
| Power | MW | 12 | 5 | 5 | 10 |
| Draft | m | 20 | 20 | 13.2 | 22 |
| Freeboard | M | 11.5 | 12 | 18 | 11 |
| Hull steel weight | mt | 3500 (NTE) | 2084 | 2660 | 3213 |
| Mast steel weight | mt | 477 | 270 | 270 | 540 |

TABLE 2-continued

Steek weight comparison between buoyant structure 100 and existing systems

|  | Units | Buoyant structure described herein | System A | System B | System C |
|---|---|---|---|---|---|
| Total steel weight | mt | 3900 (NTE) | 2354 | 2930 | 3753 |
| Steel weight/ MW | MT/ MW | <375 | 471 | 586 | 375 |

Table 2 above shows a comparison of the buoyant structure 100 and existing systems (or installations). As the other systems are catered for a different Wind Turbine Capacity, the steel weight/MW for each system provides a fairer comparison of the respective weights of the various systems. It may be observed from Table 2 that the embodiments of the buoyant structure 100 have a not to exceed (NTE) total steel weight of 3900 mt and the steel weight/MW of the embodiments of the buoyant structure 100 are lower comparing to the other existing systems.

Figure 11:
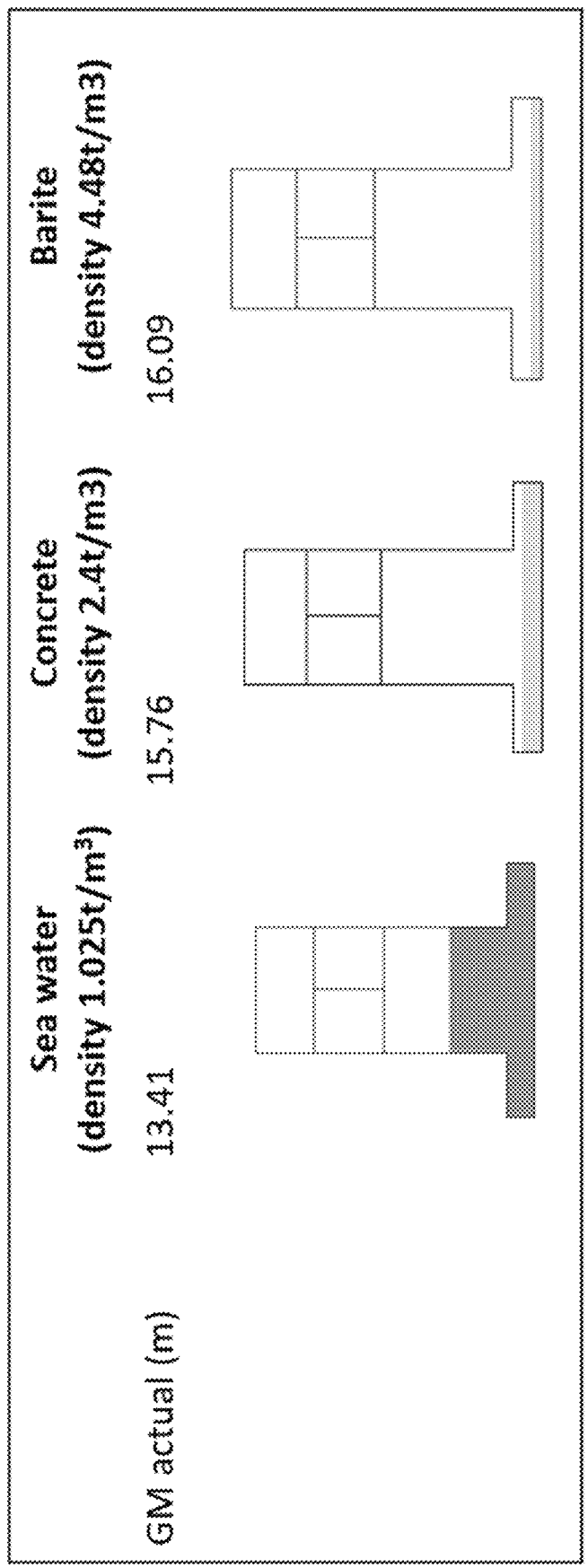
FIG. 11 shows a comparison with different ballast systems that may be used with the embodiments described.

FIG. 11 shows different ballast systems that may be used with the shaded regions indicating the ballast component. In an embodiment, sea water is used as the ballast without any other active ballast system. The open-ended channel in the lower deck 9 allows sea water to flow through. The embodiment meets intact stability as per Det Norske Veritas (DNV) requirements and damage stability as per mobile offshore drilling unit (MODU) requirements. In another embodiment, a fix ballast with different ballast content may be used with an increase metacentric height (GM) of about 1.88 m and as shown in FIG. 11. For example, concrete or barite may be used as the fixed ballast content. The ballast system may be located at and/or within pontoon 3 and/or elongate column 2.

Non-limiting conditions of where the buoyant structure 100 may be used include a wind speed of approximately 44 m/s, a significant wave height of up to and approximately 10.9 m, and a peak period range of approximately 9 to 16 seconds. The buoyant structure 100 may be modified as described above to suit the operating conditions of the environment to be operated in.

The embodiments of the buoyant structure 100 described herein provide several technical advantages compared to existing systems. The embodiments have higher operability compared to existing systems with maximised power generation and excellent motion characteristics like heave, pitch and drift. The embodiments have a robust hull design that meets industry stability requirements including damage stability and have a lower vertical centre of gravity (VCG). The embodiments have a significant hull weight reduction with a lower weight per power (MT per MW) value (or ratio) than existing systems. The embodiments possess improved structural strength and fatigue life with an estimated 25 years of lifespan. The embodiments have improved constructability with a simplified and construction friendly hull form with bended radius reducing the welding requirements. The embodiments are amenable to be scaled to meet increasing turbine capacity, for example by using a concentric or eccentric elongate column 2 arrangement on the pontoon 3 in the floatable substructure. It is expected that cost savings may be higher for larger wind turbines. In addition, no active ballast system is required, but may be provided if required depending on the environmental conditions. The embodiments have an improved weather envelope for operation, installation, and maintenance (OIM).

Various embodiments of the buoyant structure 100 may provide:
1. A buoyant structure 100 to cater for a tower 1 of a wind turbine.
2. A buoyant structure 100 with a polygonal column 2 with three or more sides and with regular or irregular shapes.
3. A buoyant structure 100 with Polygonal pontoon 3 with three or more sides and with regular or irregular shapes.
4. A buoyant structure 100 with a column-less centre column 4 with a reduced water plane area for better motion characteristics and weight savings.
5. A buoyant structure 100 with a column-less centre column 4 with increased space availability.
6. A buoyant structure 100 with improved design fatigue life at vertices (6) of the polygon
7. A buoyant structure 100 with eccentric or concentric pontoon 3 and elongate column 2 arrangements.
8. A buoyant structure with Inter-connecting structures 5 including but not limited to top, bottom, vertical and diagonal structures and bracing.

In an embodiment there is provided a floating offshore buoyant structure 100 comprising:
a column 4 configured to receive at least portion of a tower 1 of a wind turbine, wherein the column 4 has an open top end for the at least portion of the tower 1 to enter through, and an open bottom end opposite to the open top end, the open bottom end configured to allow water to flow through, thereby provide a column-less column 4; and
a plurality of floatable substructures arranged and coupled in a radial manner, extending outwardly from a central axis of the buoyant structure 100, each floatable substructure having a top end and a bottom end opposite to the top end,
wherein the column 4 is coupled to at least one of the plurality of floatable substructures such that the open top end of the column and top ends of the plurality of floatable substructures are arranged substantially along a same deck plane 22, and the open bottom end of the column and bottom ends of the plurality of floatable substructures are arranged substantially along a same keel plane 24.

Preferably, each of the plurality of floatable substructures comprises an elongate column 2 having a polygonal horizontal cross-section.

Preferably, each of the plurality of floatable substructures comprises a pontoon 3 having a polygonal horizontal cross-section.

Preferably, each of the plurality of floatable substructures comprises an elongate column 2 having a polygonal horizontal cross-section; and a pontoon 3 having a polygonal horizontal cross-section, wherein the elongate column 2 extends upwardly from the pontoon 3.

Preferably, the column-less column 4 comprises a column-less center column 4 arranged along the central axis of the buoyant structure 100.

Preferably, the column-less column 4 comprises a plurality of supports 10 extending between the open top end of and the open bottom end, the plurality of supports 10 arranged space apart from one another along a peripheral circumference of the column-less column 4. More preferably, the plurality of supports 10 forms a lattice frame 10.

Preferably, the column-less column 4 comprises a wall 10 extending between the open top end of the column and the open bottom end of the column 4, the wall 10 arranged surrounding a peripheral circumference of the column-less column 4.

Preferably, the buoyant structure 100 further comprising a jacking module disposed along the deck plane 21, wherein the jacking module is configured to raise and lower the tower 1 through the column 4.

Preferably, the buoyant structure 100 further comprising a plurality of anchoring points for mooring the buoyant structure 100.

Preferably, the plurality of floatable substructures is coupled radially and extending outwardly from the central axis of the buoyant structure by inter-connecting structures.

What is claimed is:

1. A buoyant structure for offshore deployment, the buoyant structure comprising:
    a first deck having a first channel through the first deck;
    a second deck having a second channel through the second deck, wherein the first deck and second deck are coupled to each other and arranged spaced apart from each other; and
    a plurality of floatable substructures coupled to and around at least one of the first deck and the second deck, the plurality of floatable substructures arranged spaced apart from one another,
    wherein the first channel and the second channel are aligned to receive at least a portion of a tower of a wind turbine.

2. The buoyant structure as claimed in claim 1, further comprising a plurality of connecting elements to couple the plurality of floatable substructures to at least one of the first deck and the second deck, wherein the plurality of floatable substructures is arranged around at least one of the first deck and the second deck in a radial manner, and extends outwardly from at least one of the first deck and the second deck.

3. The buoyant structure as claimed in claim 1, further comprising a support element to directly couple the first deck and the second deck.

4. The buoyant structure as claimed in claim 3, wherein the support element is characterized by at least one of the following:
    being arranged spaced apart from one another along a perimeter of the first deck and the second deck, or being selected from the group consisting of a rod, a lattice frame, a beam, a wall, and any combination thereof.

5. The buoyant structure as claimed in claim 1, wherein each of the plurality of floatable substructures comprises a top surface and a bottom surface opposite to the top surface, the top surface of the first deck and the top surface of the plurality of floatable substructures are arranged substantially along a deck plane and/or a bottom surface of the second deck and the bottom surface of the plurality of floatable substructures are arranged substantially along a keel plane.

6. The buoyant structure as claimed in claim 1, wherein each of the plurality of floatable substructures comprises an elongate column.

7. The buoyant structure as claimed in claim 6, wherein the elongate column has one of the following:
    a polygonal horizontal cross-section, or
    an octagonal or a trapezoidal horizontal cross-section.

8. The buoyant structure as claimed in claim 6, wherein each of the plurality of floatable substructures comprises a pontoon coupled to the elongate column, wherein the pontoon optionally has one of the following:
    a polygonal horizontal cross-section, or
    an octagonal or a rectangular horizontal cross-section.

9. The buoyant structure as claimed in claim 8, wherein the elongate column is coupled to one of the following:
    a substantially centre region of the pontoon, or
    a substantially off-centre region of the pontoon.

10. The buoyant structure as claimed in claim 8, wherein the elongate column comprises a top region and a bottom region opposite to the top region, the top region is coupled to the first deck and the bottom region is coupled to the pontoon.

11. The buoyant structure as claimed in claim 8, wherein the pontoon is coupled to the second deck.

12. The buoyant structure as claimed in claim 11, wherein the pontoon is coupled to the first deck.

13. The buoyant structure as claimed in claim 1, further comprising a jacking module configured to raise and lower the tower through the first channel and the second channel.

14. The buoyant structure as claimed in claim 1, further comprising a plurality of anchoring points for mooring the buoyant structure and/or a ballast system.

15. The buoyant structure as claimed in claim 1, wherein the plurality of floatable substructures comprises at least three floatable substructures.

16. The buoyant structure as claimed in claim 9, wherein the elongate column comprises a top region and a bottom region opposite to the top region, the top region is coupled to the first deck and the bottom region is coupled to the pontoon.

17. The buoyant structure as claimed in claim 2, further comprising a support element to directly couple the first deck and the second deck.

18. The buoyant structure as claimed in claim 17, wherein the support element is characterized by at least one of the following:
    being arranged spaced apart from one another along a perimeter of the first deck and the second deck, or
    being selected from the group consisting of a rod, a lattice frame, a beam, a wall, and any combination thereof.

19. The buoyant structure as claimed in claim 2, wherein each of the plurality of floatable substructures comprises at least one of the following:
    a top surface and a bottom surface opposite to the top surface, the top surface of the first deck and the top surface of the plurality of floatable substructures are arranged substantially along a deck plane and/or a bottom surface of the second deck and the bottom surface of the plurality of floatable substructures are arranged substantially along a keel plane, or an elongate column.

20. The buoyant structure as claimed in claim 3, wherein each of the plurality of floatable substructures comprises at least one of the following:
    a top surface and a bottom surface opposite to the top surface, the top surface of the first deck and the top surface of the plurality of floatable substructures are arranged substantially along a deck plane and/or a bottom surface of the second deck and the bottom surface of the plurality of floatable substructures are arranged substantially along a keel plane, or an elongate column.

* * * * *